SYNCHRONOUS DIAL MECHANISM

Filed Feb. 25, 1963 2 Sheets-Sheet 1

INVENTORS
GEORGE S. LOCKWOOD JR.
STUART W. BOREEN
BY
Fryer & Tjensvold
ATTORNEYS April 5, 1966 G. S. LOCKWOOD, JR., ETAL 3,244,817

SYNCHRONOUS DIAL MECHANISM

Filed Feb. 25, 1963 2 Sheets-Sheet 2

INVENTORS
GEORGE S. LOCKWOOD JR.
STUART W. BOREEN
BY
Fryer & Tjensvold
ATTORNEYS 3,244,817

SYNCHRONOUS DIAL MECHANISM

George S. Lockwood, Jr., San Mateo, and Stuart W. Boreen, Belmont, Calif., assignors to Dasa Corporation, a corporation of California Filed Feb. 25, 1963, Ser. No. 260,746
2 Claims. (Cl. 179—90)

The present invention relates to mechanical pulse generating equipment and more particularly to a speed control dial mechanism employing a synchronous motor as a governor.

Standard telephone equipment used by a subscriber generally includes a dial mechanism which is employed to operate a set of dialing contacts in a manner which gives rise to a dialing signal which is transmitted over telephone lines. The dial mechanism is operated by urging a spring biased dial wheel from its home position to a fixed stop position and then releasing the wheel. Upon release of the wheel the biasing spring urges the wheel back to its home position at a rate determined by a simple mechanical governor. The dialing pulse train is generated during the return movement of the dialing wheel and is comprised of pulses which are uniform in length and spacing, within limits determined by the uniformity of the return speed of the dialing wheel.

While the pulses generated by standard telephone equipment dialing mechanisms are for the most part satisfactory for telephony purposes, there are other applications for which the return speed of a conventional dialing wheel is not sufficiently uniform to meet required standards. Such a situation occurs in placing information into a repertory dialer, as fully described in assignee's copending application entitled, "Equipment and Methods for Automatic Electronic Telephone Dialing," Serial No. 249,223, filed January 3, 1963. In order to provide a satisfactory pulse generating mechanism it is necessary to alter the governor mechanism of standard telephone dialing equipment to insure that sufficient uniformity in return speed and pulse length is achieved.

One means for improving the operating characteristics of a dial mechanism includes the use of a synchronous motor as a governing device. In such an arrangement the synchronous motor is operatively disposed with respect to the dial mechanism so as to act as a brake and prevent the dial wheel from returning to its home position (from a wound up position) at a speed greater than the synchronous speed of the motor. Dial mechanisms of this nature which are known in the art employ synchronous dial motors having maximum torque characteristics exceeding the maximum opposing torque which will be applied thereto by the biasing spring of the dial mechanism. This type of design prevents the synchronous motor from being driven out of its synchronous speed and thereby losing its effectiveness as a governor.

The synchronous motor controlled dial mechanisms known in the art have a number of deficiencies which the present invention eliminates through the use of several unique combinations. One of the most serious deficiencies in synchronous motor controlled dial mechanisms as presently known resides in the necessity of employing a one way clutch or similar type mechanism between the dial wheel shaft and the shaft of the synchronous control motor. The use of a one way clutch is necessary to enable the dial wheel to be urged away from its home position without having to work against the motor. Motors with maximum torque ratings in their synchronous speed range which are greater than the maximum opposing torque of the standard telephone dial mechanism are of such size as to be very difficult to wind-up against. Such a motor also causes an uncomfortable reaction with the finger of an operator of a dial mechanism when the stop device is engaged if the inertia of the motor is allowed to act in the wind-up operation. Thus, the synchronous motor controlled dial mechanisms as presently known in the art effectively remove the synchronous motor from the shaft of the dial wheel when the dial wheel is being wound up and engage the two shafts when the dial is released and allowed to be urged toward its home position. The use of a one way clutch has the disadvantage of increasing the size and complexity of the device as well as providing an additional source of malfunction.

Another disadvantage of motor controlled dial mechanisms as known in the art is found in the fact that motors presently employed often operate in a stepping manner rather than a continuous manner and thereby enable the uniformity of the pulses generated by the dial mechanism to vary more than desired from the required standards.

Accordingly, it is an object of the present invention to provide a mechanical pulse generating mechanism employing a synchronous motor governor mechanism whereby the shaft of the governor motor and the pulse generating means are effectively connected at all times.

It is another object of the present invention to provide a synchronous motor controlled telephone dial mechanism whereby the shaft of the dial mechanism and the shaft of the synchronous control motor are operatively connected both when the dial mechanism is wound up as well as when it is released.

It is a further object of the present invention to provide a dial mechanism employing a synchronous control motor whereby the maximum torque to be applied to the shaft of the synchronous motor is greater than the maximum torque at which the motor operates in its synchronous range.

It is yet another object of the present invention to provide a synchronous motor controlled dial mechanism where the motor is of sufficiently low inertia to enable a dial wheel connected thereto to be easily wound up and not be a source of difficulty in dialing or injury to a user of the dial mechanism.

Further and more specific objects and advantages of the invention are made apparent in the following specification wherein a preferred form of the invention is described by reference to the accompanying drawings.

Figures 1, 2:
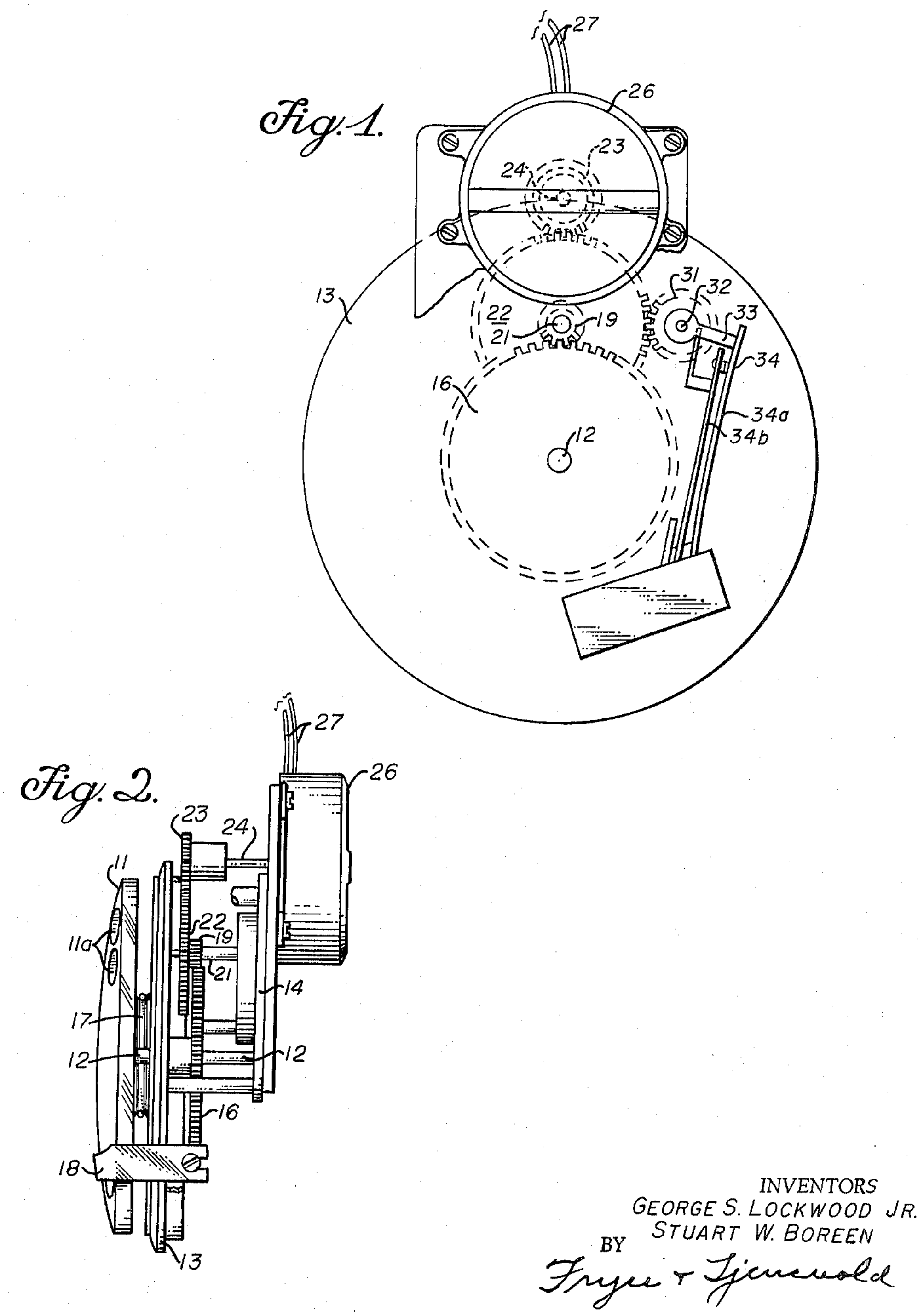
FIG. 1 is a rear plan view of the dial mechanism of the present invention wherein the mechanical gear connection and dialing contacts are shown.
FIG. 2 is a side elevation of the dial mechanism of the present invention.

Referring now to FIGS. 1 and 2, a dial mechanism dialing wheel 11 is supported by a main shaft 12 which is rigidly secured at one of its ends to the dialing wheel 11 and extends through a front mounting plate 13 to a rear mounting plate 14 in which the other end of the shaft is rotatably secured. Fixedly secured on the main shaft 12 is a main shaft drive gear 16 which rotates whenever the drive shaft 12 is caused to rotate by movement of dial wheel 11.

A biasing spring 17 is operatively disposed between the dial wheel 11 and front mounting plate 13 in such a manner as to be wound up when the dial wheel is urged away from its home position. Biasing spring 17 applies a force to the dial wheel 11 which urges it toward its home position such that the dial wheel can only be in a position other than its home position by virtue of the application of some external force. In the normal operation of a dialing mechanism of the type being described, the dialing wheel is displaced from its home position by selecting any one of the finger holes 11*a* and rotating the hole clockwise until the mechanical stop member 18 is engaged. Since the spring 17 is disposed so as to be wound up by clockwise movement of dial wheel 11 it follows that the magnitude of the return torque applied to the dial wheel 11 when it is released will be increasingly greater as the selected finger hole 11*a* is further disposed, in a counter-clockwise direction, from the stop member 18.

Figure 3:
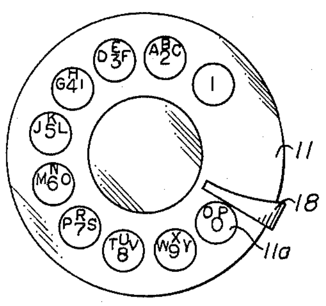
FIG. 3 is a front plan view of a dial wheel shown in its home position.
Figure 4:
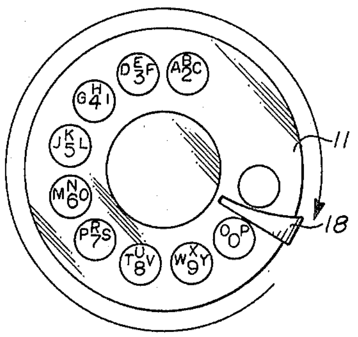
FIG. 4 is a front plan view similar to FIG. 3 but with the dial wheel shown in its extreme wound up position.

FIG. 3 shows the dial wheel 11 in its home position in which it is maintained by spring 17 which resists movement of the dial wheel away from this position. FIG. 4 shows the dial wheel 11 in its extreme clockwise position (achieved by selecting the finger hole 11*a* over the zero in FIG. 3 and rotating it to the stop 18). In the extreme position of FIG. 4 the spring 17 will exert the maximum return torque experienced by the dial wheel in its normal operation. After the dial wheel is released from the position shown in FIG. 4 it will return to its home position at a rate of speed fixed by governer means, and will experience progressively less return torque as it gets closer to the home position.

Referring once again to FIGS. 1 and 2 the return movement of dial wheel 11 from a wound up position causes main gear 16 to rotate which in turn rotates a small gear 19 which meshes with gear 16. Gear 19 is mounted on a shaft 21 which also carries a gear 22. Shaft 21 is mounted between front mounting plate 13 and rear mounting plate 14 in a rotatable manner such that rotation of gear 19 by gear 16 rotates shaft 21 causing gear 22 to rotate. Gear 22 meshes with a gear 23 which is mounted on a shaft 24 of a synchronous motor 26. A pair of electrical wires 27 provide means for connecting the synchronous motor 26 to a source of electrical energy (not shown) which energizes the motor and causes drive shaft 24 to rotate at a fixed synchronous speed. The direction which shaft 24 is driven is such as to produce rotation of dial wheel 11 in a counter-clockwise (or towards home) direction. Thus, in operation the dial wheel is wound up in a clockwise direction driving gears 16, 19, 22 and 23 causing the shaft 24 of synchronous motor 26 to be driven in a direction opposite to that which the shaft is normally driven by the motor. Upon release of the dial wheel spring 17 will urge the dial wheel in a counter-clockwise direction at a speed generally greater than the synchronous speed of motor 26. Since the dial wheel 11 is mechanically connected through gearing to the shaft of the synchronous motor, the motor will act as a brake and prevent the dial wheel from traveling at a speed greater than the synchronous speed of the motor.

The present invention provides an advancement in the art by virtue of the fact that the synchronous motor 26 is operatively connected to the shaft 12 of dial wheel 11 through mechanical gearing which does not include or require a one way clutch or equivalent device. By virtue of the elimination of such device the shaft of the synchronous motor has torque applied thereto in a reverse direction when the dial wheel 11 is wound up from the home position. The elimination of a one way clutch so as to provide direct drive both when winding up the dialing wheel as well as when it is returning to its home position requires a unique set of limitations on the synchronous motor 26. It is by virtue of these as well as other limitations that the present invention is able to operate successfully without the use of a one way clutch and as a consequence thereof provide greater accuracy than is available with systems presently known in the art.

In order to eliminate the necessity for a one way clutch in the mechanical connection between the synchronous motor 26 and main dial shaft 12, it is necessary to employ a motor which is of sufficiently low inertia to enable the dial wheel 11 to be wound up without being opposed by the motor to a burdensome extent. If the inertia of the motor is too great it will not only cause difficulty in winding up the dial but will also cause a wedging action between a finger placed in a dial hole 11*a* and the stop mechanism 18 when the stop is encountered. This can result in annoying if not harmful consequences to the user of the dial mechanism and thus must be avoided. Since the maximum torque which a synchronous motor can have applied to it and still operate in its synchronous speed range is a function of the inertia of the motor, a reduction in the inertia of the motor to overcome the difficulties mentioned above lowers the maximum torque which the dial mechanism can safely apply to the shaft of the motor and still have it operate properly. Dial mechanisms which are presently known in the art (and generally associated with telephony) include biasing springs which produce a maximum return torque when the dial wheel is displaced to the position shown in FIG. 4 which is greater than the maximum rated torque of a synchronous motor of low enough inertia to be operable without a one way clutch. Thus, the reduction in the inertia of the motor solves one problem but in doing so creates another.

The problem involved in applying more torque to the shaft of the synchronous motor than it is rated for is best illustrated with reference to FIG. 5. The solid line in the graph (consisting of a vertical line and a horizontal line) represents the normal torque-speed characteristic of a synchronous motor. When the torque applied to the shaft of the motor is between zero and the point $a$, the speed of the motor is constant at the synchronous speed. When a torque greater than the maximum rated torque (a torque above the point $a$ on the torque scale) is applied to the shaft of the motor, the motor becomes overdriven and completely loses its synchronous characteristic. When this occurs a gradual reduction of the torque applied to the shaft to a magnitude below the maximum rated torque will not return the speed of the motor to the synchronous speed since there is no retarding force acting on the speed of the motor once it has exceeded its rated maximum torque. Thus, if the synchronous motor employed in a dial mechanism has a maximum torque rating which is less than the torque applied to the motor when the dial mechanism is wound up to its extreme position, then the motor will have no governing effect upon the dial and will not serve the desired purpose. It has been found that the torque which is applied to the shaft of a synchronous motor disposed as illustrated in FIGS. 1 and 2 when the dial mechanism is wound to the position shown in FIG. 4 is some value $b$ which is greater than the maximum torque rating of a motor having sufficiently low inertia to be usable.

Figure 5:
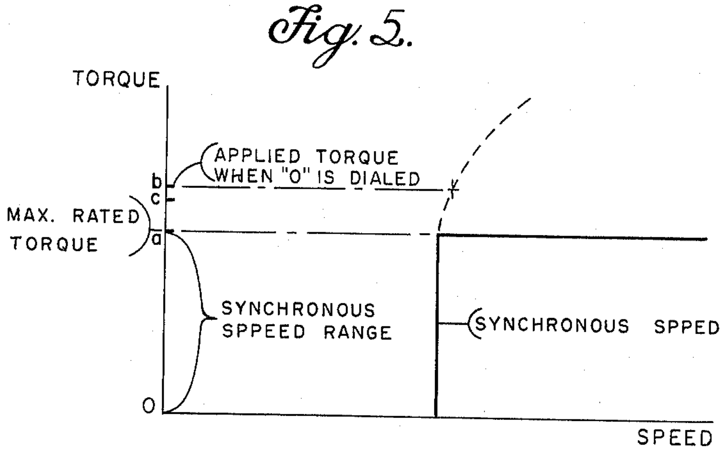
FIG. 5 is a graph of speed vs. torque for the synchronous motor employed in the present invention.

It has been found that the torque-speed relationship of hysteresis type motors (as opposed to permanent magnet type synchronous motors) is not the same as that illustrated by the solid lines in FIG. 5. While it is not altogether certain exactly what the characteristics of a hysteresis type motor is when the maximum rated torque has been exceeded, it is known that the speed increases gradually with torque as illustrated by the dotted line of the graph of FIG. 5. By employing a motor which has a synchronous speed characteristic which does not break down completely when the maximum torque rating is exceeded, it is possible to exceed the maximum rated torque and still operate at a synchronous speed when the torque falls back into the synchronous speed range. This is due to the fact that there is a retarding force exerted on the shaft of the motor even though the motor is allowed to operate at a speed greater than the synchronous speed. This retarding force enables the synchronous speed to be regained once the torque applied to the shaft is reduced below the maximum rated torque. Thus, if the torque which is applied to the shaft when the dial is completely wound up as shown in FIG. 4 is that represented at point $b$, the operation of the synchronous motor will begin at the point marked $x$ on the dotted line and follow this line as the torque applied to the shaft decreases until the synchronous (vertical line) portion of the graph is reached. In order to understand how the error introduced by the non-synchronous operation of the motor does not materially reduce the effectiveness of using a synchronous motor, it is necessary to describe briefly the operation of the dialing contacts.

Referring to FIG. 1, a gear 31 meshes with gear 22 and is driven thereby. Gear 31 is mounted on a shaft 32 which also has mounted thereon a cam operated stirrup 33. Stirrup 33 engages one half of dialing contacts 34 which include contact 34$a$ and contact 34$b$. When the dialing wheel is released the gear 31 is driven in a direction which causes the cam operated stirrup 33 to travel radially in and out and thus separate contact 34$a$ from 34$b$ once each time the dial wheel travels through a given arc length. The separations of the dialing contacts form the pulses which the entire mechanism is designed to create. When the dial wheel is initially released from a wound up position the stirrup 33 does not cause the contacts to separate immediately but waits until the dial wheel has gone through a certain arc length toward the home position. After the first operation of the stirrup to separate the dialing contacts the subsequent pulses are formed at regular intervals wherein the intervals are generally of shorter length than the interval between the initial release of the dialing wheel and the first pulse.

Since the point $b$ on the graph of FIG. 5 represents the maximum torque to be applied to the shaft of the synchronous motor 26 (which occurs when the dial wheel is in the position shown in FIG. 4) and the torque which is applied reduces as the dialing wheel moves in the counterclockwise direction, the torque which is applied to the synchronous motor when the first dialing pulse is formed will most likely be at some position on the torque scale between points $b$ and $a$ such as at point $c$. It is to be noted that depending upon the motor and the displacement of the dial wheel from its home position, it is altogether possible that the point $b$ will in fact lie somewhere below the point $a$. In any event, by the time the second pulse is formed the dialing wheel will have moved in a clockwise direction sufficiently to reduce the spring force (by unwinding the spring) such that the torque which it applies to the shaft of the synchronous motor will lie below the point $a$. Operation subsequent to the second pulse will be controlled by the synchronous speed of the motor. Thus, the only place where error is to be expected lies somewhere between the first pulse and the second pulse where the synchronous motor may operate at a speed greater than the synchronous speed. It has been found in practice that the difference between the synchronous speed and the speed at which the dial wheel is able to operate prior to synchronous speed being obtained is very slight and easily tolerated even in systems requiring very high degrees of accuracy.

Thus, the present invention teaches the use of a synchronous motor having a maximum torque rating less than that to be expected in actual operation of the dialing mechanism but which is none the less effective in providing the desired governing action. As shown above, this enables the dialing mechanism to provide a pulse train of exceptional accuracy without the use of special clutch mechanisms or the like. A further benefit which is provided by the present invention is found in the fact that hysteresis type motors are continuous running motors as opposed to permanent magnet type synchronous motors which operates in steps. The stepping nature of the operation of permanent magnet type synchronous motors introduces error into the dialing pulses which is often greater than can be tolerated when high level accuracies are required.

We claim:

1. In a dial mechanism including a dial wheel having a home position, a dial shaft connected to and rotated by the dial wheel, a biasing spring which is disposed to furnish a torque acting to return the dial wheel to its home position when it is rotated therefrom wherein the spring is wound up by the movement of the dial wheel from its home position such that the amount of return torque provided by the spring increases as the dial wheel is rotated further from the home position, and a set of dialing contacts operably associated with the dial shaft in such a manner as to be pulsed when the dial wheel moves toward its home position, the number of times which the contacts are pulsed being related to the rotation of the dial shaft prior to the dial wheel moving toward its home position, the combination comprising:
   a low inertia, hysteresis type synchronous motor having a drive shaft, a torque range from zero to a maximum torque within which it operates at its synchronous speed, and a speed to torque characteristic above the maximum torque wherein both speed and torque increase; and
   means operatively connecting the motor drive shaft to the dial shaft such that the motor drive shaft has an external load applied thereto by the biasing spring when the dial wheel is moved away from its home position;
   the external load applied to the motor shaft from the biasing spring when the dial wheel is moved its maximum distance from its home position being greater than the maximum rated torque of the motor for its synchronous speed range, the load externally applied to the motor shaft being reduced as the dial wheel moves counterclockwise by said spring unwinding, the magnitude of the load externally applied to the motor shaft being within the synchronous range by the time the contacts have been pulsed a second time.

2. A telephone dial mechanism including a dial wheel which is, first, rotatable away from a home position to select a train of telephone dial pulses to be generated, the length of each such train differing with displacement of the dial wheel, and, then, rotatable back toward its home position to actuate a pulsing switch thereby to generate a selected one of a plurality of trains of telephone dial pulses, such dial mechanism comprising:
   (a) means for rotating the dial wheel away from its home position to a position corresponding to any selected train of telephone dial pulses;
   (b) a spring coacting with the dial wheel to urge such wheel toward its home position;
   (c) a synchronous motor geared to the dial wheel normally to urge such wheel toward its home position, the torque exerted by such motor on the dial wheel being less, when the dial wheel is displaced from its home position to select the longest one of the trains of telephone dial pulses, than the torque then exerted by the spring on the dial wheel and being greater, when the dial wheel is displaced from its home position to select the next to the longest one of the trains of telephone dial pulses, than the torque then exerted by the spring on the dial wheel; and,
   (d) means actuating the pulsing switch only during the period of time in which the dial wheel is being returned to its home position.

References Cited by the Examiner

UNITED STATES PATENTS 2,392,726 1/1946 Crocker ----------- 179—90.1

KATHLEEN H. CLAFFY, *Primary Examiner.*

ROBERT H. ROSE, *Examiner.*

S. J. BOR, *Assistant Examiner.*